United States Patent
Kinstle, III et al.

(10) Patent No.: US 9,766,668 B2
(45) Date of Patent: Sep. 19, 2017

(54) FORCED AND NATURAL CONVECTION LIQUID COOLER FOR PERSONAL COMPUTER

(71) Applicant: Corsair Memory, Inc., Fremont, CA (US)

(72) Inventors: Robert Michael Kinstle, III, Fremont, CA (US); Michael Hooper, Fremont, CA (US)

(*) Notice: Subject to any disclaimer, the term of this patent is extended or adjusted under 35 U.S.C. 154(b) by 0 days.

(21) Appl. No.: 15/182,355

(22) Filed: Jun. 14, 2016

(65) Prior Publication Data

US 2017/0052576 A1    Feb. 23, 2017

Related U.S. Application Data

(60) Provisional application No. 62/208,512, filed on Aug. 21, 2015.

(51) Int. Cl.
*H05K 7/20* (2006.01)
*G06F 1/20* (2006.01)
*G06F 1/18* (2006.01)

(52) U.S. Cl.
CPC ............... *G06F 1/20* (2013.01); *G06F 1/183* (2013.01); *G06F 2200/201* (2013.01)

(58) Field of Classification Search
CPC ........................................................ H05K 7/20
USPC .................................................... 361/679.21
See application file for complete search history.

(56) References Cited

U.S. PATENT DOCUMENTS

2004/0221604 A1* 11/2004 Ota ................... H05K 7/20781
                                                                   62/259.2
2009/0168346 A1*  7/2009 Miyoshi ............. H05K 7/20145
                                                                     361/695

* cited by examiner

*Primary Examiner* — Jerry Wu
(74) *Attorney, Agent, or Firm* — Corsair Memory, Inc.

(57) ABSTRACT

A small form factor computer chassis is disclosed. The computer chassis includes a solid bulkhead that separates the computer chassis cavity into two thermal chambers. According to certain embodiments, a radiator that is oriented along the XZ plane and is along a wall of computer chassis helps remove heat from a liquid coolant arriving form a cold plate associated with a CPU and/or a GPU.

10 Claims, 9 Drawing Sheets

FORCED AND NATURAL CONVECTION LIQUID COOLER FOR PERSONAL COMPUTER

CROSS-REFERENCE TO RELATED APPLICATIONS

The present application claims the benefit of U.S. Provisional Patent Application Ser. No. 62/208,512, filed Aug. 21, 2015 and entitled "Forced and Natural Convection Liquid Cooler for Personal Computer," which is hereby incorporated by reference in its entirety.

TECHNICAL FIELD

The present invention is directed to small form factor computers with high performance hardware.

DETAILED DESCRIPTION OF THE INVENTION

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

Consumers demand small form factor computers with high performance hardware. However, small computers often are not able to cool high-powered central processing units (CPU's) and graphics processing units (GPU's) at acceptable noise levels. Many computer systems use top down fans that blow heat from the CPU and/or GPU onto the motherboard components, and thus further exacerbate the system cooling problems. Small computer cases often rely on high-speed small diameter fans (e.g., 40 mm, 60 mm, 80 mm) that spin at high speeds and that create a lot of noise.

Figure 1:
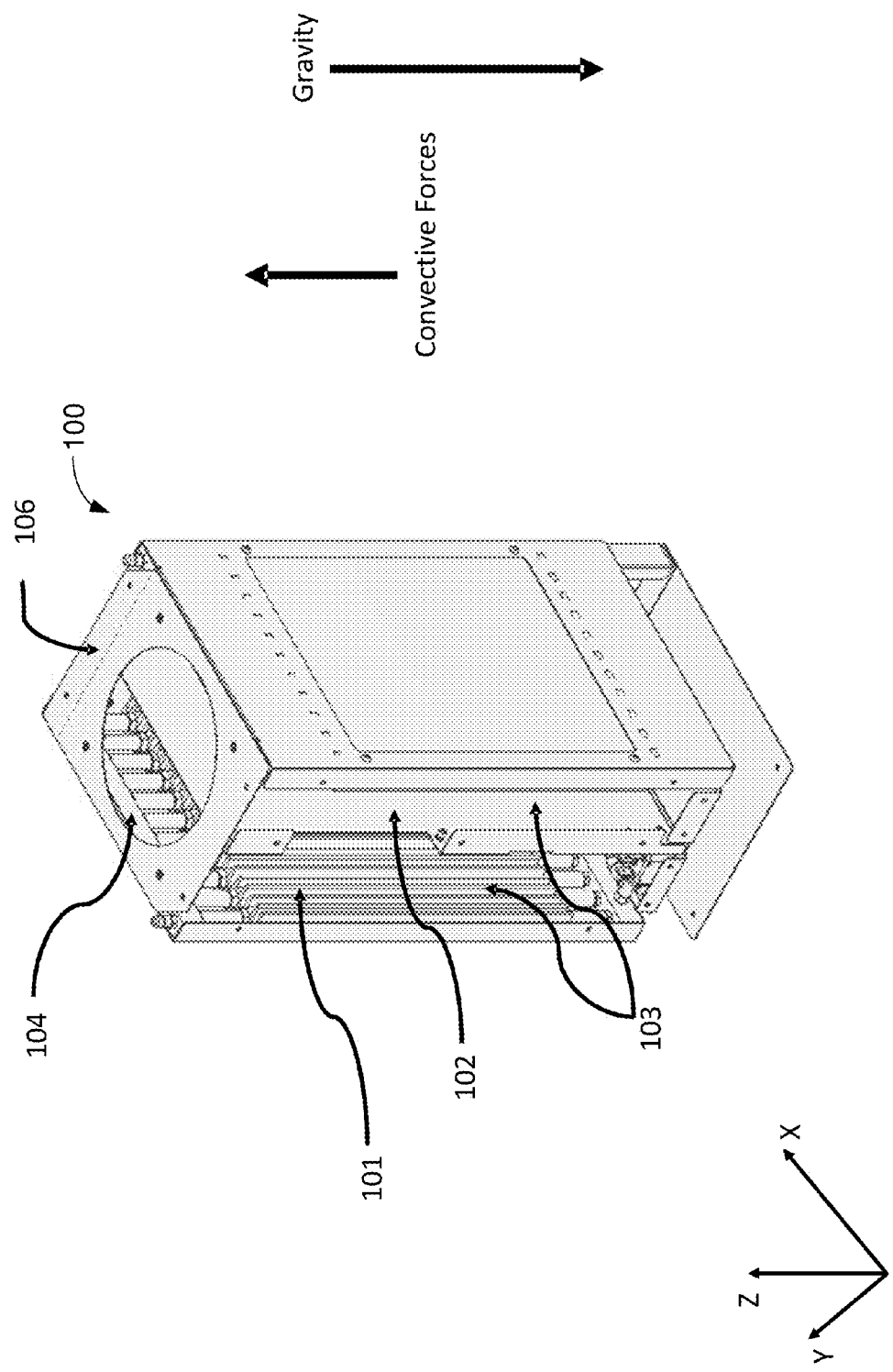
FIG. 1 is a perspective view of a computer chassis, according to certain embodiments.

FIG. 1 is a perspective view of a computer chassis 100, according to certain embodiments. The chassis 100 houses the computer cooling system and other computer components. The cooling system comprises several components working together to efficiently remove heat from the system at low levels of noise. Such cooling system components include: Radiator(s) (see 310 of FIG. 3), pump(s), cold plates, tubing, chassis exhaust fan and control systems, as non-limiting examples.

FIG. 1 shows a radiator 101 that includes a large panel mounted just inside of the chassis 100. The radiator 101 is described in further detail herein with reference to FIG. 2. The primary heat transfer area may be inside of the chassis or outside of the chassis via large openings of the chassis 100.

FIG. 1 shows a computer chassis 100 that includes a bulkhead 102 that separates chassis 100 into two thermal chambers 103. Bulkhead 102 is in the XZ plane of the chassis 100. A motherboard and its attendant CPU (which is a heat source) is attached to one side of bulkhead 102 in one of the thermal chambers 103. A GPU (which is another heat source) is attached to the other side of bulkhead in the other thermal chamber 103. The motherboard/CPU and the GPU are not shown in FIG. 1. The placement of the motherboard/CPU and the GPU are described in greater detail with respect to FIG. 6 herein.

According to certain embodiments, the CPU and the GPU, each has its own radiator and may share a pump or, alternatively have its own pump.

FIG. 1 shows one of the radiators 101 that includes a large panel mounted just inside of the chassis 100. In FIG. 1, radiator 101 is oriented along the XZ plane and is along one wall of chassis 100. The radiator 101 is described in further detail herein with reference to FIG. 2.

Heat transfer can occur as follows. To explain, coolant fluid transfers heat from the CPU (via a cold plate) and the hot coolant fluid enters the radiator at the top 104 of the radiator and cools off as the fluid travels downward due to gravity along the Z axis. For example, the coolant fluid is pumped through the CPU where heat is transferred from the CPU via a cold plate to the fluid and from there, the fluid flows to the top of the radiator with the help of the pump.

An exhaust fan can be positioned at top opening of the chassis at 106 in order to help pull the hot air out of the chassis (convective forces in the positive Z direction against the direction of gravity, as shown in FIG. 1).

Figure 2:
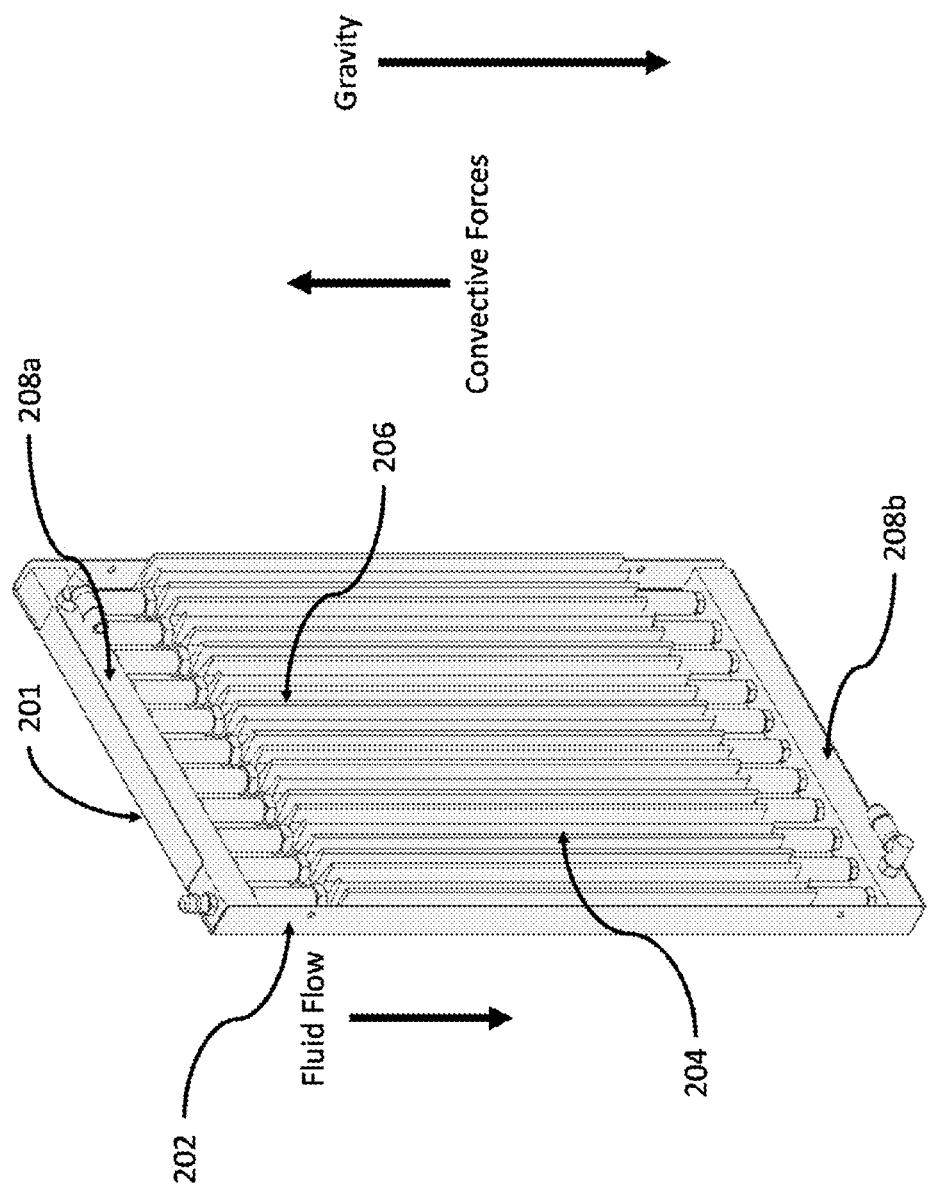
FIG. 2 shows a radiator for use in a computer chassis in order to remove heat from the heat sources in the computer chassis, according to certain embodiments.
Figure 5:
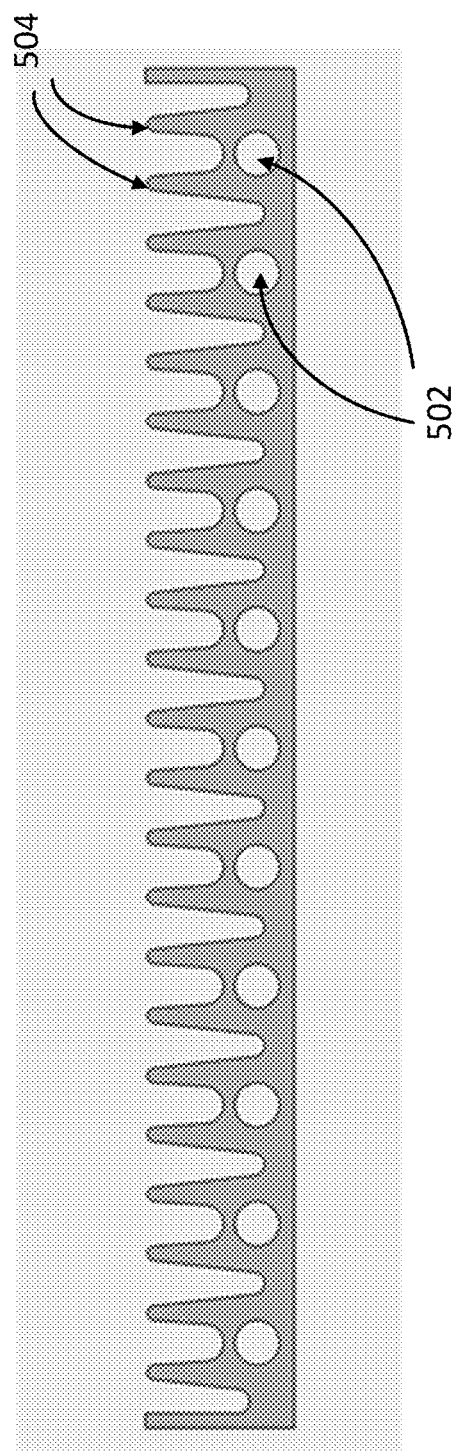
FIG. 5 shows cross section of radiator that can be used in the computer chassis, according to certain embodiments.

FIG. 2 shows a radiator for use in a computer chassis in order to remove heat from the heat sources in the computer chassis, according to certain embodiments. FIG. 2 shows a radiator 201. As a non-limiting example, the radiator comprises a large extruded metal panel 202 with a plurality of hollow channels 204 and fins 206. The fins 206 are designed to promote convective airflow over the surface of the radiator. The coolant fluid flows through the hollow channels 204 of the radiator. (FIG. 5 shows cross section of the radiator, according to certain embodiments. FIG. 5 shows a plurality of hollow channels 502 and a plurality of fins 504.)

FIG. 2 shows a top manifold 208a at the top of the radiator and a bottom manifold 208b at the bottom of the radiator. According to certain embodiments, the top manifold 208a allows the high velocity fluid arriving from the cold plate to divide between all the hollow channels of the radiator. The fluid is cooled as it travels to the bottom of the radiator. The cooled fluid from the plurality of hollow channels rejoins at the bottom manifold 208b of the radiator. The air flowing over the fins of the radiator helps transfer the heat away from the radiator which in turns transfers heat away from the fluid as the fluid flows through the radiator. By the time the fluid reaches the bottom manifold 208a, the fluid is cooled.

In another embodiment, the radiator may consist of a long serpentine metal tube rerunning side to side and in a general downward direction and bonded to a large number of thin metal plates acting as a heat transfer surface. The function of the radiator embodiments is to remove heat from the coolant fluid and transfer the heat to the surrounding air. In reference to FIG. 1, the top 106 of the chassis 100 (the top of the system with respect to gravity) near the exhaust fan is the hottest section of the system.

Figure 3:
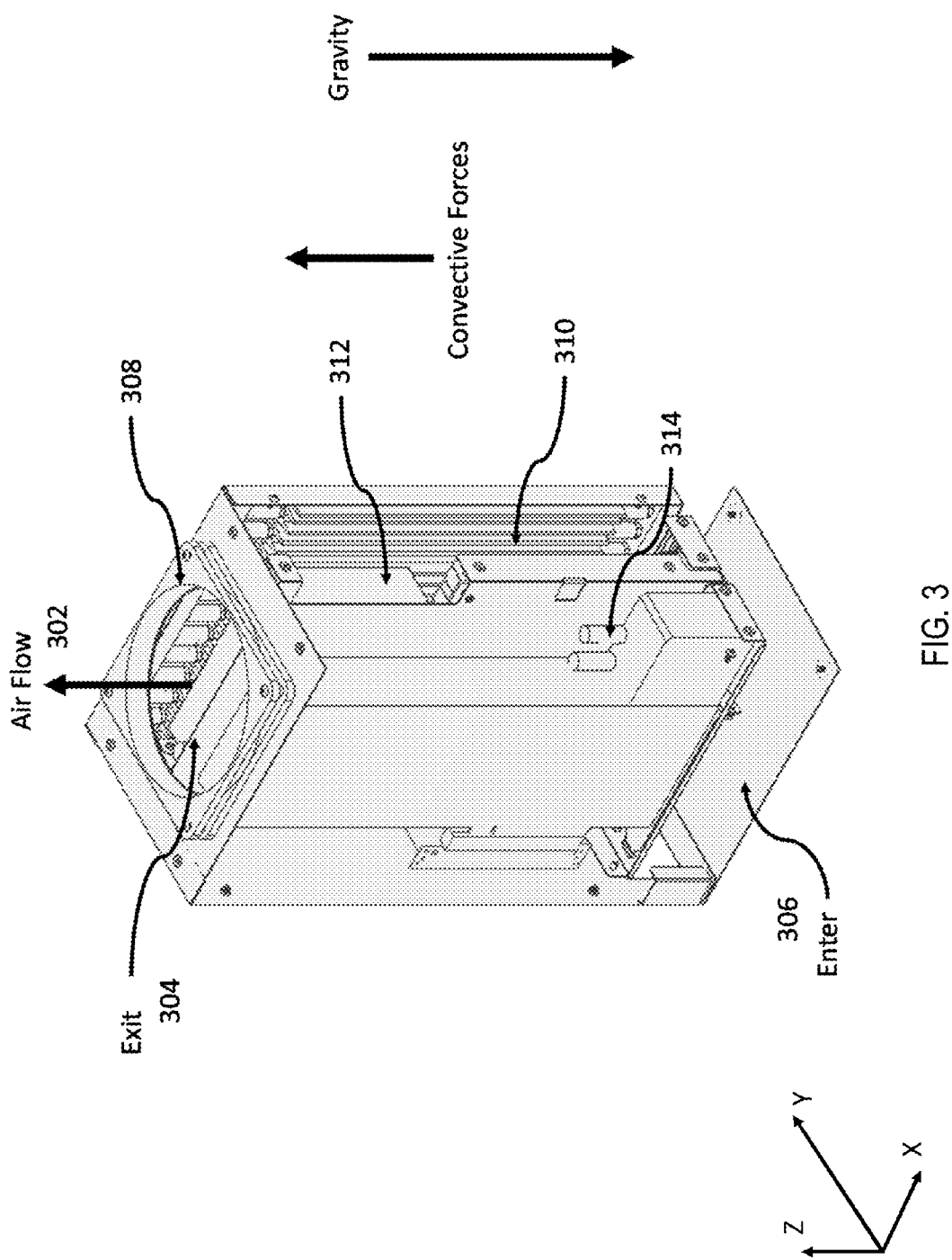
FIG. 3 shows heat can be transferred out of the computer chassis by airflow entering the chassis at the bottom of the chassis and exiting the top of the chassis with the help of convective forces, according to certain embodiments.

As previously explained, according to certain embodiments, the CPU and the GPU, each has its own radiator and may share a pump or, alternatively, each may have its own pump (e.g., see 314 of FIG. 3). The pump(s) is mounted at the bottom of the chassis (with respect to gravity). The pump(s) collects the cooled fluid from the bottom of the radiator at the highest possible inlet pressure and fluid density that is optimal for pumping the fluid upward against the flow of gravity to the cold plates of the CPU and GPU respectively. The system may use one pump to share fluid between the CPU and GPU cooling loop, according to certain embodiments. According to certain embodiments, the CPU and GPU may also share one radiator. According to another embodiment, the CPU and GPU may have independent cooling loops with their own pump, cold plate, and tubing.

FIG. 3 shows that heat can be transferred out of the computer chassis by airflow 302 entering the chassis at 306 and exiting the top of the chassis at 304 with the help of convective forces, according to certain embodiments. Further, an exhaust fan can be installed at location 308, according to certain embodiments.

According to certain embodiments, each of the cold plates (e.g., one for the CPU and one for the GPU) comprises a small cavity that is bordered along its major axis, a metal plate, made of metal with a thermal conductivity no less than 50 W/mK and no more than 1500 W/mK, for example. The metal plate has a series of thin fins on one side, achieved usually by microskiving, through which fluid flows and absorbs heat from the metal. The cold plate assembly is contained by an enclosure that is made of a material that is impermeable to the coolant fluid and has sufficient structural integrity to withstand the clamping force and operating pressure/temperature range.

The CPU and GPU, each have their own cold plate assembly attached directly to the major heat source in the CPU and GPU, respectively. In the single pump embodiment, separate tubes for the CPU and GPU carrying coolant fluid would flow in parallel. In some embodiments, the system has only one cold plate for the CPU or GPU alone and may contain one or two radiators.

According to certain embodiments, tubing for carrying the coolant fluid consists of a flexible rubber, plastic, or a Teflon based material that is specifically designed for low permeation of the coolant elements (typically a mixture of water, propylene glycol, a corrosion inhibitor, and an anti-microbial compound). The tubing can be extra-long so as to serve as a service loop that can access the other components in the chassis without disconnecting the cooling solution from the radiators, pumps, chassis, or cold plates.

While the system is designed to take advantage of convective airflow by creating a thermal chimney effect within the chassis, the use of one or more cooling fans can dramatically increase the heat capacity of the system (e.g., exhaust fan can be installed at the top of the chassis such as location 308 of FIG. 3, according to certain embodiments). Furthermore, a fan may be installed to provide cooling airflow to other components (e.g. components 312 in the chassis of FIG. 3) that generate heat but are not connected to the coolant fluid loops. Such components include but are not limited to power supply units, regulation components, processing elements, storage devices, memory, and data interfaces in the chassis. The natural bottom to top (with respect to gravity) airflow design promotes highly laminar flow over the radiators and also over the internal components installed in the chassis. The CPU and GPU thermal loads are separated into distinct chambers.

Figure 4:
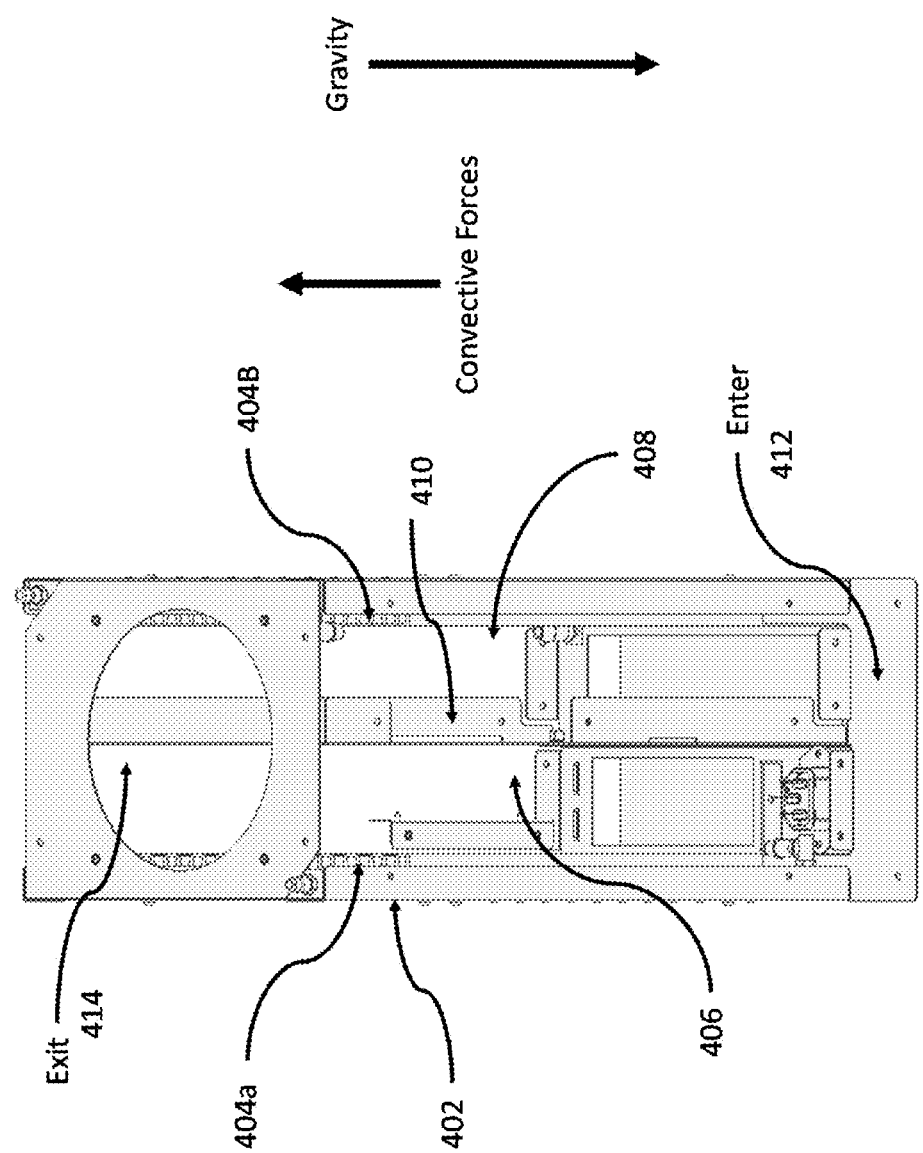
FIG. 4 shows a top foreshortened view of a computer chassis that is divided into two chambers by a central bulkhead, according to certain embodiments.

FIG. 4 is a top foreshortened view of a computer chassis 402 that is divided into two chambers 406 and 408 by a central bulkhead 410, according to certain embodiments. The GPU can be mounted on one side of the bulkhead 410, e.g., in chamber 408, while the motherboard (with CPU) and the power supply unit can be mounted to the other side of the bulkhead 410, e.g., in chamber 406. Air can enter the chassis at the bottom 412 of the chassis and flow upwards though chambers 406, 408 and over radiators 404a, 404b and exiting through the top 414 of the chassis. Heat can be carried out of the chassis by the airflow through the chambers with the aid of natural convective forces. An exhaust fan can also be mounted to the top 414 of the chassis to suck the hot air out of the chassis. The two chambers 406, 408 help confine the heat loads in separately managed areas. In some embodiments the exhaust fan can be turned off and the system can rely on convection for airflow and cooling. Further, by having the GPU installed on one side of the bulkhead and the CPU on the other side of the bulkhead (creating two separate thermal chambers), allows for a small form factor chassis design, as explained further with reference to FIG. 8 herein.

Figure 6:
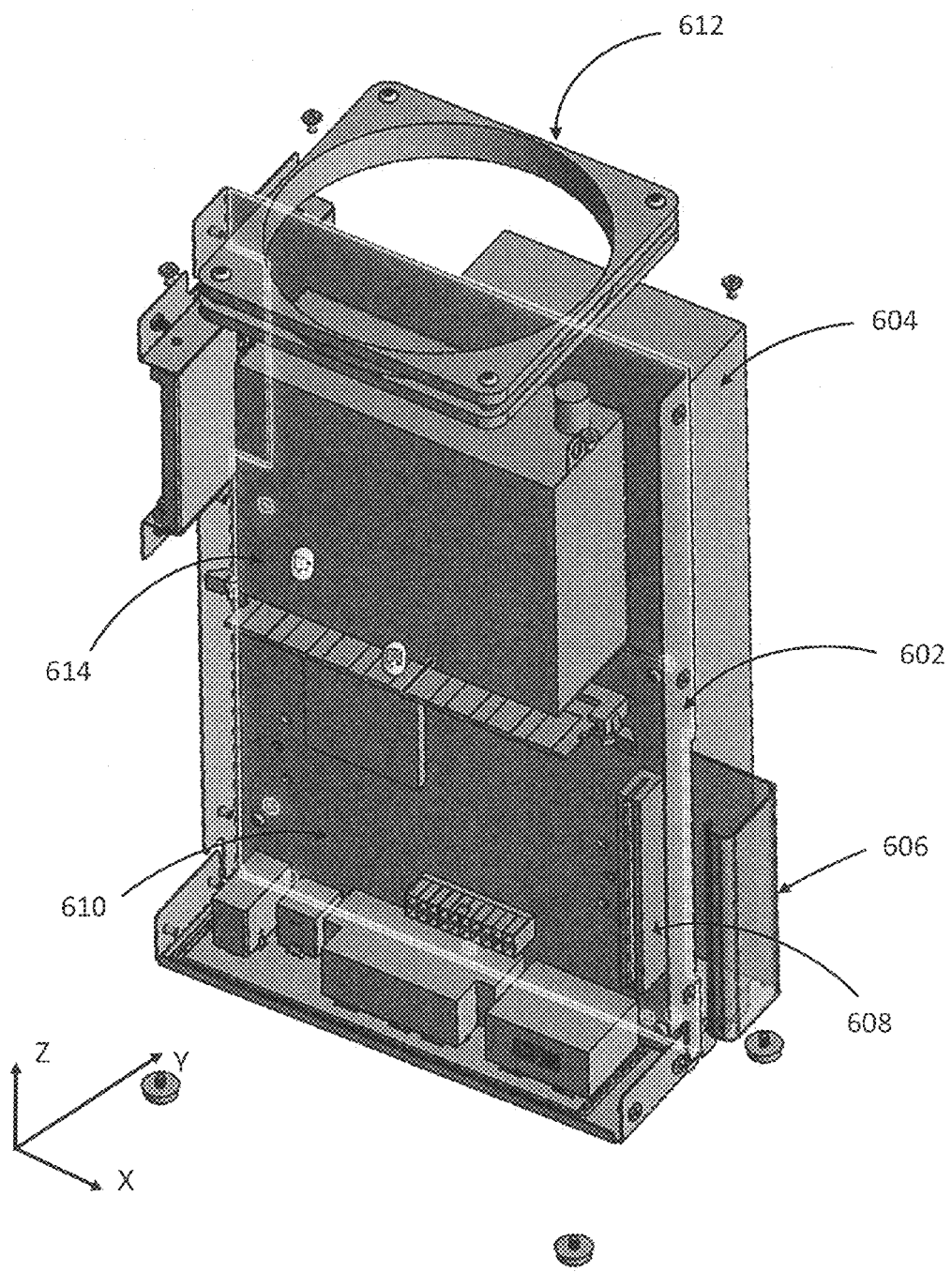
FIG. 6 is a side perspective view of the bulkhead of a computer chassis, according to certain embodiments.
Figure 7:
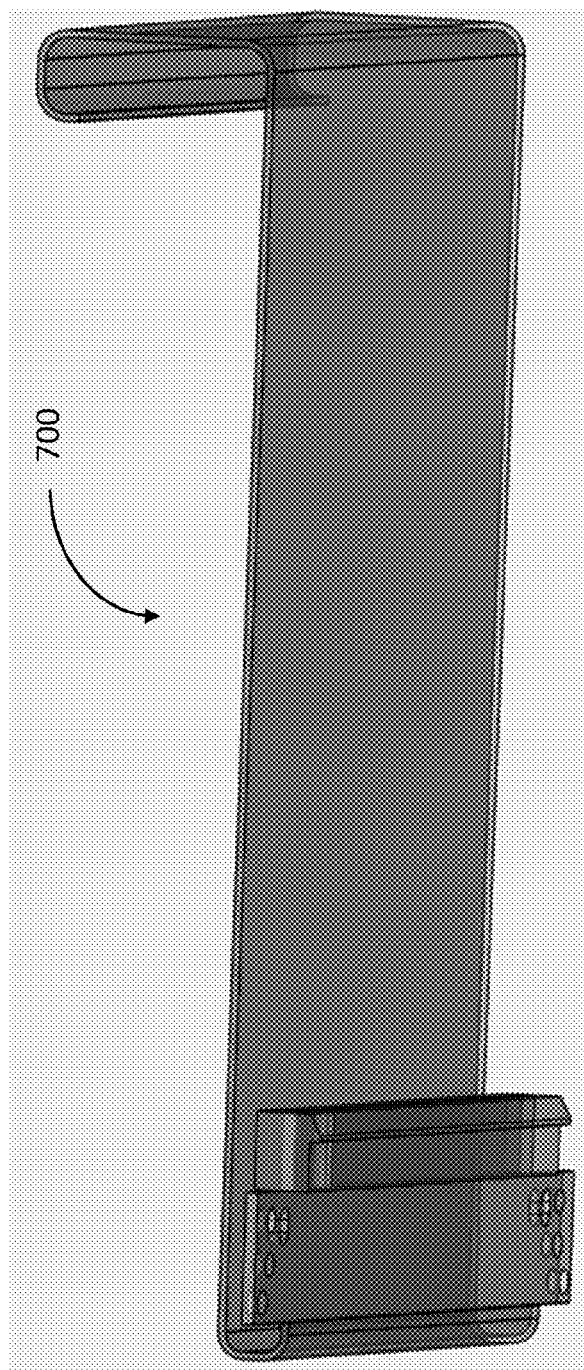
FIG. 7 shows a flexible riser card, according to certain embodiments.

FIG. 6 is a side perspective view of the bulkhead 602 of a computer chassis, according to certain embodiments. The GPU 604 is mounted on one side of the bulkhead 602, while the motherboard 610 (with CPU) and the power supply unit 614 can be mounted on the other side of the bulkhead 602. GPU 604 can be connected to the motherboard via a flexible riser card 606 at card slot 608, for example. An exhaust fan can be mounted to the top 612 of the chassis. FIG. 7 shows a flexible riser card 700, according to certain embodiments.

Figure 8:
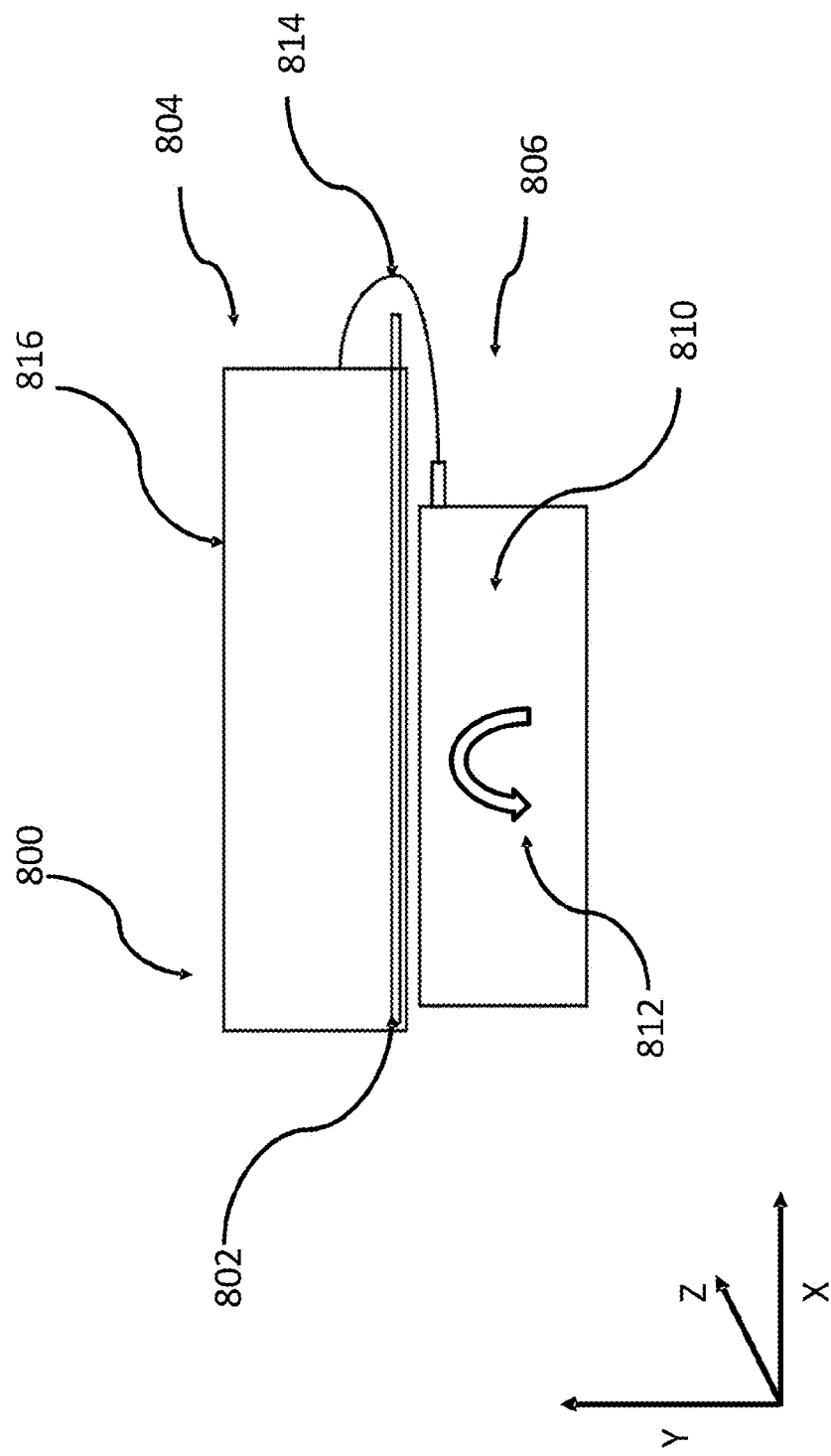
FIG. 8 is a bottom up view of the computer chassis, according to certain embodiments.

FIG. 8 is a bottom up view of the computer chassis 800, according to certain embodiments. FIG. 8 shows motherboard 802 mounted to one side of the bulkhead (bulkhead is not shown in FIG. 8). FIG. 8 also shows the motherboard I/O shield 816. The bulkhead separates chassis 800 into two chambers 804, 806. GPU 810 is mounted on the other side of the motherboard and is connected to the motherboard via a riser card or flexible data cable 814. Such a configuration of the GPU 810 relative to the motherboard 802 reduces the chassis size along the Y axis (the central plane of the motherboard is along the X axis). Thus, such a configuration allows for a compact form factor of the chassis. Further, according to certain embodiments, the orientation of GPU 810 can be rotated 812 within chamber 806 either to maximize cooling efficiency for the liquid cooling system or the air cooling system for cooling the GPU.

Figure 9:
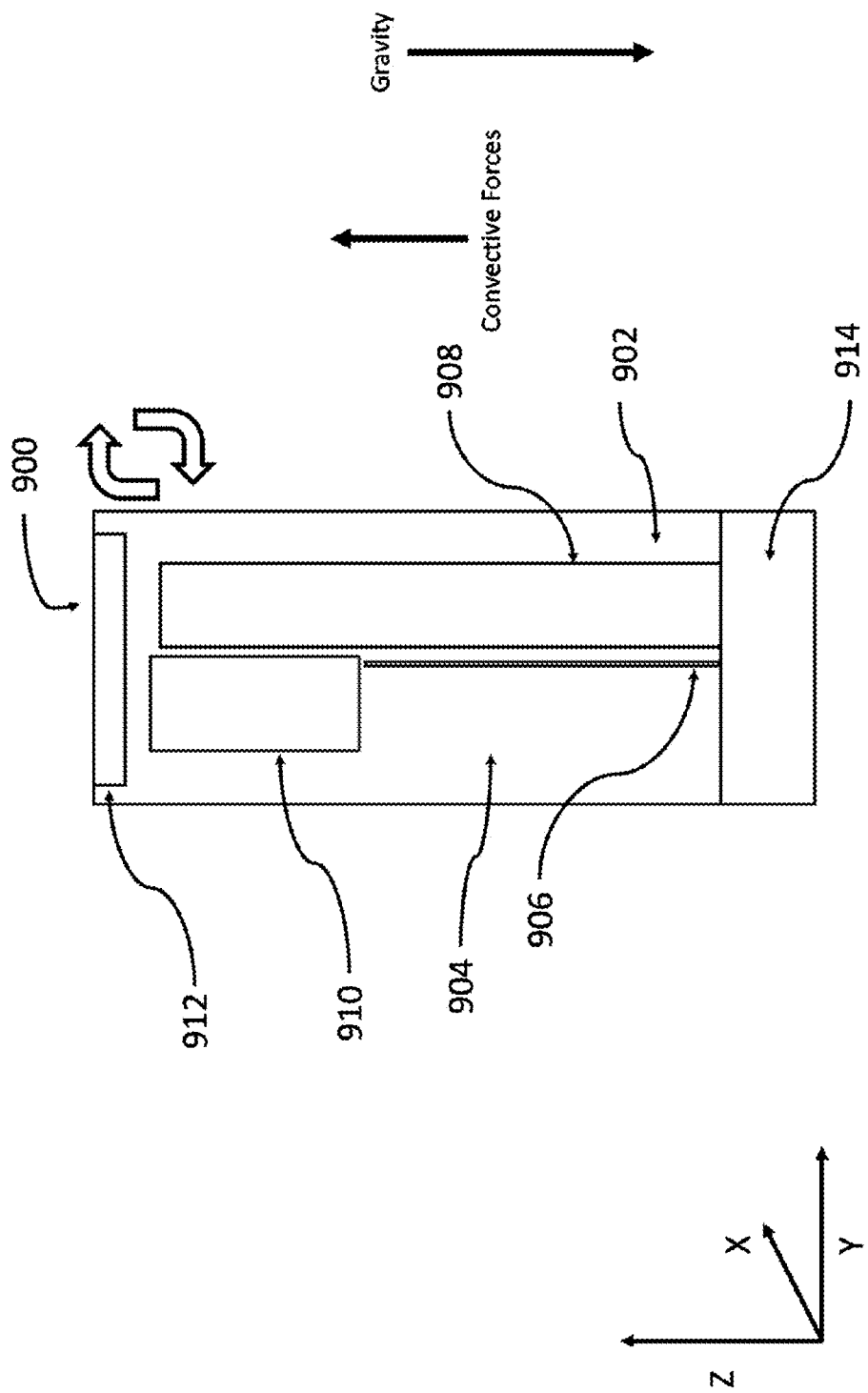
FIG. 9 shows a side view of computer chassis, according to certain embodiments.

FIG. 9 shows a side view of computer chassis 900, according to certain embodiments. FIG. 9 shows chassis shows motherboard 906 and power supply unit 910 mounted to one side of the bulkhead (bulkhead is not shown in FIG. 9). FIG. 9 shows chassis shows a graphics processing unit 908 mounted to other side of the bulkhead. The bulkhead separates chassis 900 into two chambers 902, 904. An cooling exhaust fan 912 can be mounted at the top of the chassis to help cool the components mounted in the chassis. FIG. 9 also shows a cable managements system 914 to hide unsightly cables from view. According to certain embodiments, the chassis is designed using VESA mounting holes (or some other suitable open standard for mounting holes).

The system may include a control system inside the chassis to control the chassis fan(s) speed by monitoring sensors associated with component temperature, coolant temperature, or power supply load to determine the cooling needs of the system and adjust fan speed accordingly with the goal of providing adequate cooling at minimal noise. The control system may have an external data interface or operate standalone. The control system may be analog with discrete components or digital with a logic device or micro controller and it may output different voltages to the fan motor or a digital control signal such as pulse width modulation to regulate the fan's speed.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

We claim:

1. A computer chassis comprising: a chassis frame encompassing a chassis cavity, the computer chassis having a top chassis portion oriented in a first X-Y plane of the computer chassis, a bottom chassis portion oriented in a second X-Y plane of the computer chassis, a front chassis portion oriented in a first Y-Z plane of the computer chassis, and a back chassis portion oriented in a second Y-Z plane of the computer chassis; a right side outer panel oriented in a first X-Z plane of the computer chassis; a left side outer panel oriented in a second X-Z plane of the computer chassis; a central solid bulkhead in the chassis cavity, the central solid bulkhead occupying and entire cross sectional area of the chassis cavity and is oriented in a third X-Z plane of the computer chassis, where the third X-Z plane is located about midway in a Y direction of the computer chassis, wherein: the central solid bulkhead runs from the top chassis portion to the bottom chassis portion and from the front chassis portion to the back chassis portion; the central solid bulkhead divides the chassis cavity into a first chassis cavity portion and a second chassis cavity portion, wherein the first chassis cavity portion forms a first thermal chamber of the computer chassis for housing a power supply unit, a motherboard and a corresponding central processing unit and the second chassis cavity portion forms a second thermal chamber of the computer chassis for housing a graphics processing unit connected to the first thermal chamber via a flexible cable; and convective forces in a positive Z direction carries heat from the bottom chassis portion to the top chassis portion.

2. The computer chassis of claim 1, wherein the first chassis cavity portion is for housing a motherboard and a corresponding central processing unit associated with the motherboard.

3. The computer chassis of claim 1, wherein the second chassis cavity portion is for housing a graphics processing unit.

4. The computer chassis of claim 1, wherein the first chassis cavity portion is for housing a power supply unit.

5. The computer chassis of claim 1, wherein the first chassis cavity portion is for housing a first radiator unit.

6. The computer chassis of claim 1, wherein the second chassis cavity portion is for housing a second radiator unit.

7. The computer chassis of claim 5, wherein the first radiator unit is associated with a pump to circulate coolant liquid from a heat source in the computer chassis to the first radiator unit, wherein the coolant liquid removes heat from the heat source and the coolant liquid is cooled at the first radiator unit.

8. The computer chassis of claim 6, wherein the second radiator unit is associated with a pump to circulate coolant liquid from a heat source in the computer chassis to the second radiator unit, wherein the coolant liquid removes heat from the heat source and the coolant liquid is cooled at the second radiator unit.

9. The computer chassis of claim 1, further comprising at least one exhaust fan located at the top chassis portion, wherein the at least one exhaust fan pulls air out of the first and second thermal chambers of the computer chassis.

10. The computer chassis of claim 1, wherein the bottom chassis portion allows air from outside the computer chassis to flow into the computer chassis.

* * * * *